Sept. 29, 1942.  K. FROEHLICH  2,297,465
SPRING SUSPENSION FOR ROAD VEHICLES
Filed Sept. 24, 1940
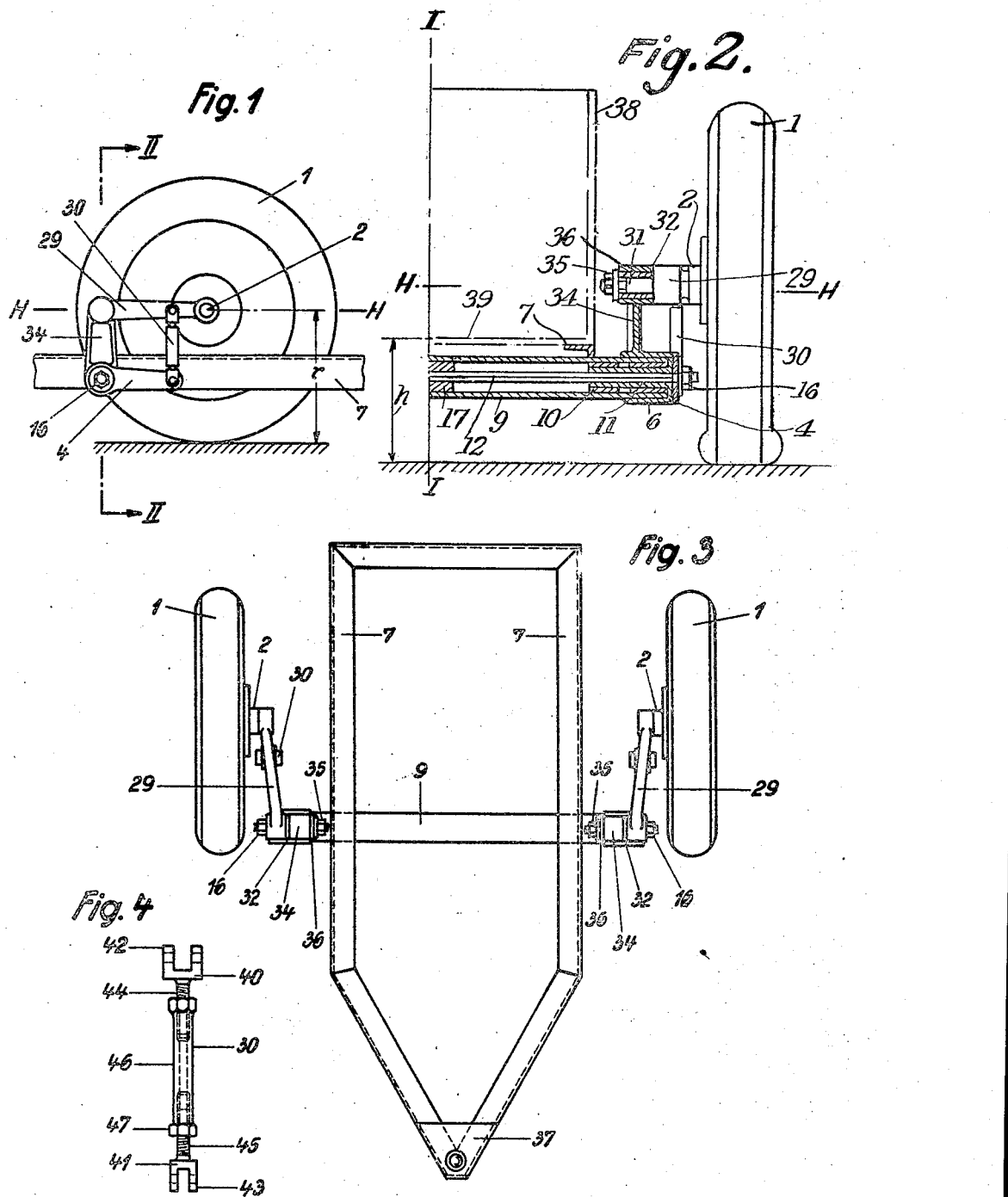

Patented Sept. 29, 1942

2,297,465

UNITED STATES PATENT OFFICE 2,297,465

SPRING SUSPENSION FOR ROAD VEHICLES

Karl Froehlich, Stuttgart, Germany; vested in the Alien Property Custodian

Application September 24, 1940, Serial No. 358,118
In Germany October 16, 1939

2 Claims. (Cl. 267—57)

This invention relates to spring suspensions for road vehicles and has for an object to provide improved means of this type adapted for power vehicles or trailers.

It is an object of the invention to provide such spring suspensions having wheel supporting means adapted to support the road wheel for movement in a generally vertical plane generally parallel to the longitudinal central plane of the vehicle, and having separate spring reaction transmitting means movable in a generally vertical plane generally parallel to the central longitudinal vertical plane of the vehicle, together with means for interconnecting said spring reaction transmitting means to the wheel supporting means.

Another object is to arrange the spring reaction transmitting means below the axis of the road wheels.

Another object is to provide such a construction in which the spring comprises a rotary spring such as a torsion bar housed in a tubular member comprising a transverse frame member and in which the wheel supporting means is pivoted to a bracket extending above the frame whereby the frame may be located closer to the ground than the axis of the road wheels.

It is another object to connect the spring reaction transmitting means with the wheel supporting means by means of a tension member which is preferably adjustable in length.

Other objects will appear from the following description of one illustrative embodiment of the invention taken together with the attached drawing wherein:

Fig. 1 is a side view of a vehicle illustrating the invention, the vehicle shown being a trailer, the left wheel having been removed to facilitate the disclosure;

Fig. 2 is a cross-sectional view taken along the line II—II of Fig. 1;

Fig. 3 is a plan view of such a vehicle; and

Fig. 4 is an enlarged view of the adjustable tension member.

Referring to said drawing, the numeral 1 indicates road wheels of usual construction carried upon bearing studs 2, which studs are carried by generally horizontally extending levers 29 shown pivoted at their forward ends to the upper ends of brackets 34 firmly attached as by welding to the projecting ends of a tube 9 which comprises a portion of the frame of the vehicle and to which are attached the frame members 7, the forward ends of which are joined by means of a connecting plate 37 which may form part of the trailer hitch. Said frame may serve to support any suitable body such as that indicated in dotted lines by the numeral 38, or may have simply a load supporting platform 39. The upper ends of the brackets 34 are formed with openings receiving studs 31 connected with the arm 29 having threaded extension receiving nut 35 under which may be placed a plate or washer 36. A bushing 32 of suitable material, such as synthetic material, may be used around the stud 31.

The parts thus far described comprise a vehicle frame together with means for supporting the road wheels relative to the frame for movement in a vertical plane parallel to the central longitudinal vertical plane of the vehicle, the axes of which are normally located in the horizontal plane H—H. The wheel supporting means 29 and 34 and the pivot joints therefor merely serve the purpose of supporting the frame relative to the road wheels.

In the illustrative form shown, the springing means proper comprises a torsion bar 12, shown as of square cross-section, the central portion of which is anchored in the abutment member 17 in the central vertical plane I—I of the vehicle and the outer portions of which are connected to for rotation with the arms 4 which are pivotally mounted through bearing studs 6 journaled within the ends of the tube 9 as by bushings 10 and 11 of suitable material such as synthetic bearing material.

The nuts 16 located upon the ends of the torsion bar 12 hold said bar firmly in position and at the same time hold the arms 4 thereon.

The numeral 30 indicates any suitable connecting member between the arms 4 and lever 29 serving to transmit the spring reaction from the arm 4 to the lever 29 and thus to the wheel supporting stud 2. The member 30 is preferably so constructed as to be adjustable in length which may desirably be effected by means of the construction shown in Fig. 4, which shows terminal members 40 and 41 provided with eyes 42 and 43 respectively and oppositely threaded portions 44 and 45, one being threaded right hand and the other left hand, which threaded portions are connected by the sleeve 46 having suitable internal threads thereon. It is clear that through rotation of member 46 adjustment of the length of the member 30 is made possible. A lock nut 47 is preferably provided to protect against loosening and loss of adjustment.

It is apparent from Figs. 1 and 2 that the height of the loading surface 39 or the bottom of the body 38 is normally considerably less than half the wheel diameter r. Therefore, the vehicle may be easily loaded and the center of gravity thereof, whether loaded or empty be kept extremely low. It will also be noted that the spring and spring reaction transmitting members are not used to support the wheel relative to the frame and that the wheel supporting members are used only for that purpose. The compounding of stresses upon the various parts is therefore eliminated, wherefore said parts may be of relatively light construction.

The connection of the arm 4 with the tube 9 may desirably be such as to provide shock absorbers which can readily be accomplished by providing suitable friction materials pressed together through the action of the torsion bar 12 and nuts 16.

Having described an illustrative embodiment of the invention it is pointed out that various changes and modifications therein may be made without departing from the invention, it being intended that the patent shall cover, by suitable expression in the appended claims, all features of patentable novelty existing in the invention disclosed, as illustrated by the embodiment described.

I claim:

1. In a vehicle, a frame comprising a transverse tubular member, road wheels, means for supporting said road wheels relative to the frame comprising brackets attached to and extending upwardly from the terminal portions of said tubular member, generally horizontally extending levers each pivoted at one end to one of said brackets for movement in a generally longitudinal vertical plane and supporting a road wheel at its other end, torsion bar spring means within said tubular member supported by an abutment near the center of said tubular member, and spring reaction transmitting means the latter comprising an arm extending generally horizontally below said lever, and a tension link means between said arm and said lever.

2. The combination of claim 1 in which said arm is journaled within said tubular member and means are provided on the ends of said torsion bar means to hold said arm in place relative to said tubular member.

KARL FROEHLICH.